July 6, 1926.
E. HUTCHENS
1,591,130
BEAD FLIPPING MACHINE
Filed June 12, 1924    3 Sheets-Sheet 1
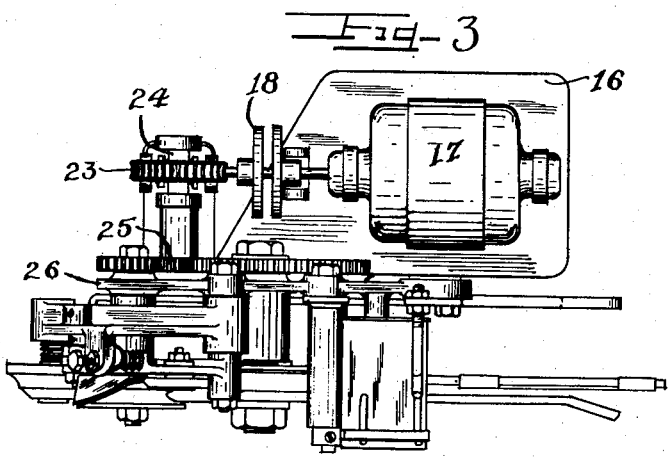
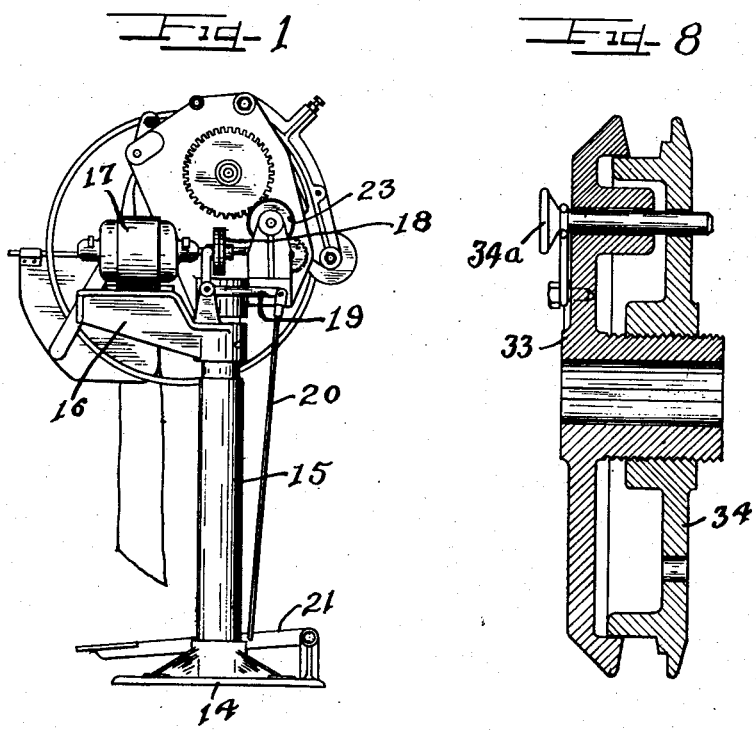
Inventor
Edward Hutchens
by
Attys.

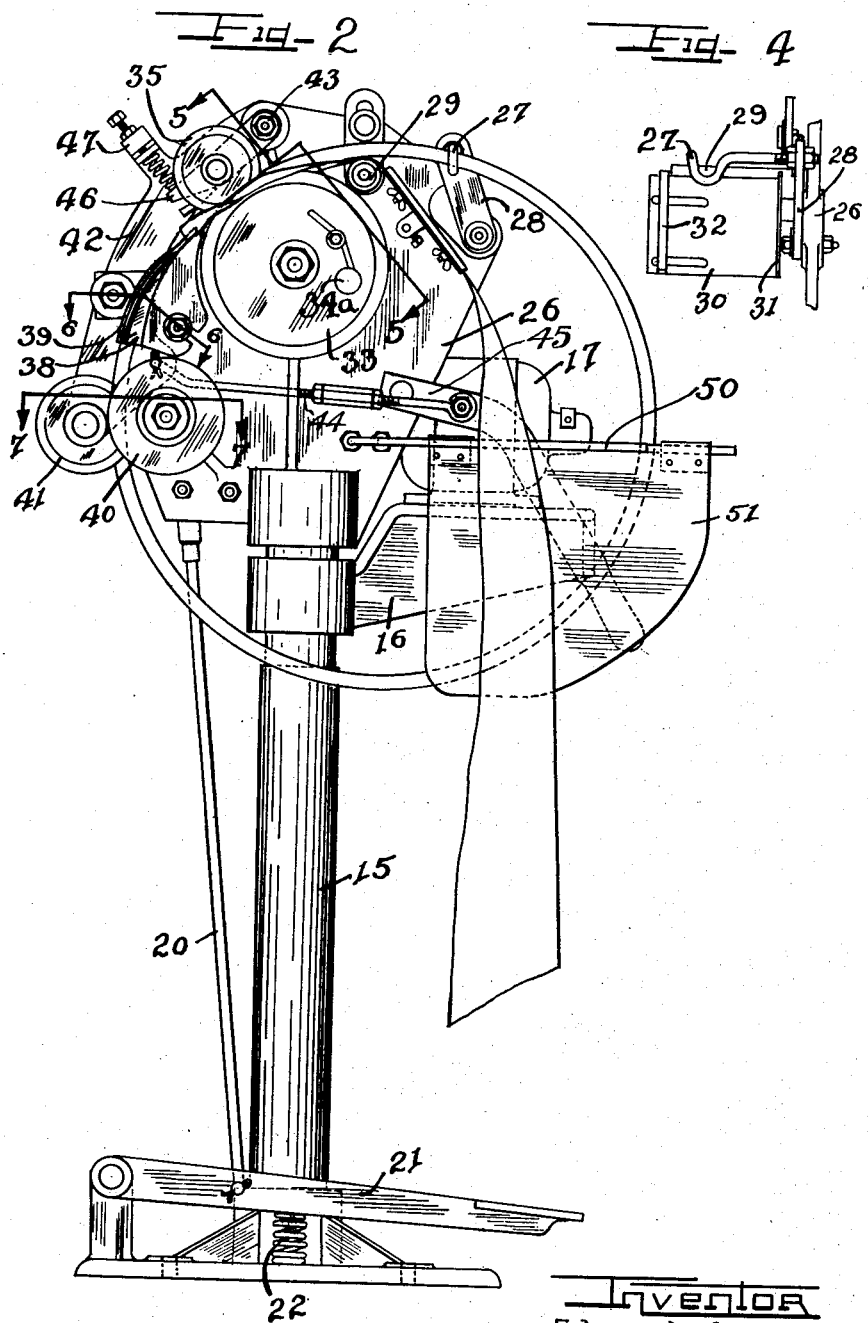

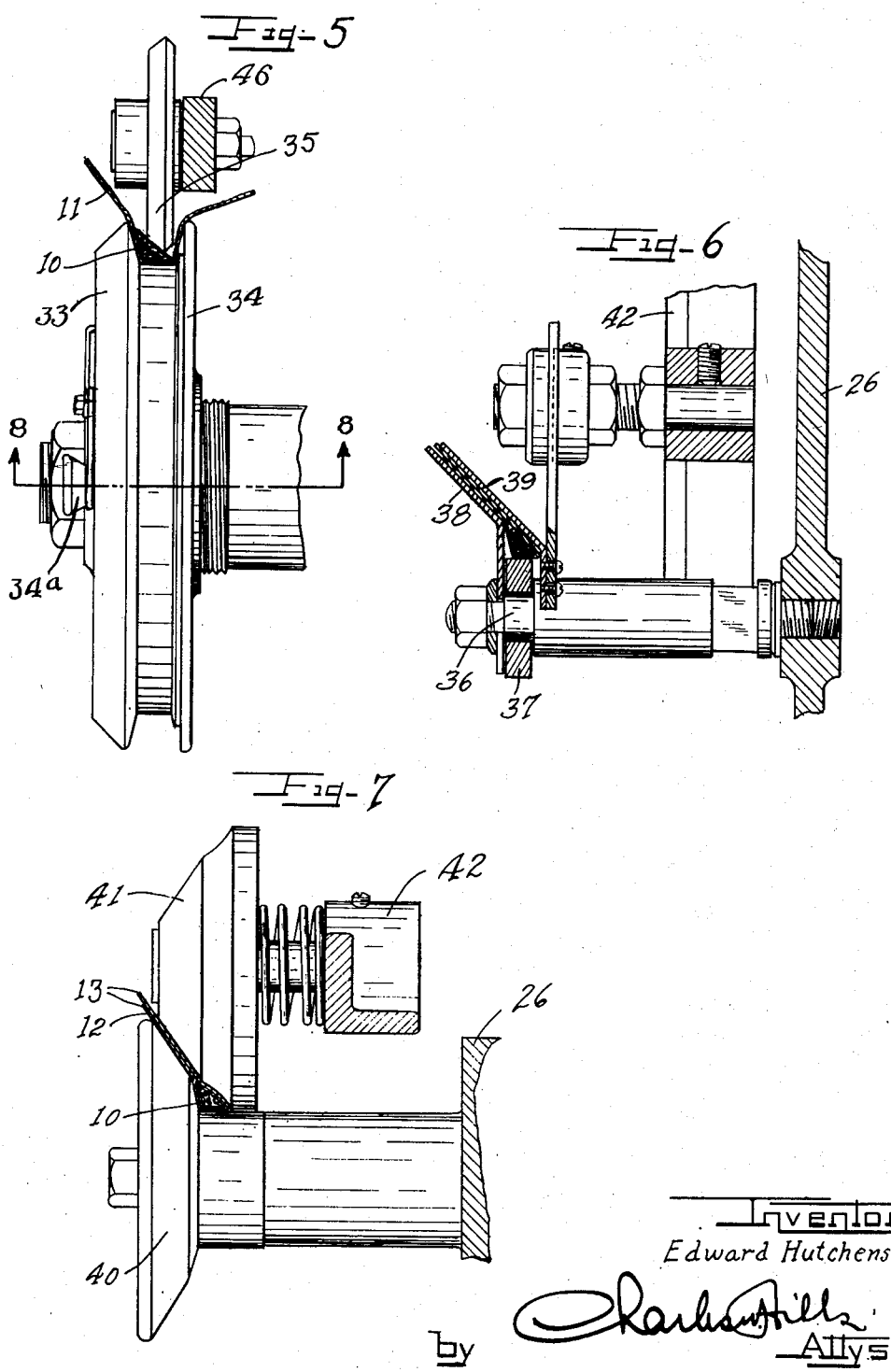

Patented July 6, 1926.

1,591,130

UNITED STATES PATENT OFFICE.

EDWARD HUTCHENS, OF MILWAUKEE, WISCONSIN, ASSIGNOR TO UTILITY MANUFACTURING CO., OF CUDAHY, WISCONSIN, A CORPORATION OF WISCONSIN.

BEAD-FLIPPING MACHINE.

Application filed June 12, 1924. Serial No. 719,497.

This invention relates to a machine for applying the flipper strip of rubberized fabric to the beads used in manufacturing pneumatic tires.

It is an object of this invention to provide a machine which at a single set up is capable of performing the sequence of operations required to fold a strip of rubberized fabric about a tire bead and to roll the assembly into binding contact as a unit.

It is also an object of the invention to provide adjustable guiding means for the fabric whereby the amount of lap or stagger of the finished flipper strip may be altered at the will of the operator.

It is another object of this invention to provide an automatic folder for the fabric whereby the operator will not have to handle the tacky material after bringing the bead and fabric together for the first operation.

It is a further object of this invention to provide an automatic stretcher for the projecting edges of the flipper strip after folding about the bead. This stretcher prevents ruffling of the flipper material and causes the same to stand out straight as a segment of a conical surface having the desired angle with the axis of the bead to be assembled into a tire carcass without further operations thereon.

It is still a further object of this invention to provide a single lever movement adapted to lift or separate all the rollers and folders operating on the outer periphery of the bead whereby the completed bead and flipper strip may be removed and another placed in position.

It is another object of this invention to provide a universal bead flipping machine adaptable to varying shapes and diameters of beadings.

Other and further important objects of this invention will be apparent from the disclosures in the specification and the accompanying drawings.

This invention (in a preferred form) is illustrated in the drawings and hereinafter more fully described.

On the drawings:

Figure 1 is a rear elevation of a complete machine with a bead and flipper strip inserted in a position to be operated on.

Figure 2 is an enlarged fragmentary front elevation of the machine corresponding to Figure 1.

Figure 3 is a top plan view of the machine with the work omitted.

Figure 4 is a fragmentary side view of the strip guiding mechanism.

Figure 5 is a fragmentary section on the line 5—5 of Figure 2.

Figure 6 is a fragmentary section on the line 6—6 of Figure 2.

Figure 7 is a fragmentary section on the line 7—7 of Figure 2.

Figure 8 is a section on the line 8—8 of Figure 5.

As shown on the drawings:

The material to be worked upon comprises a semi-curved bead 10, which style is chosen for illustration, is of the straight side having a non-stretchable core. A flipper strip 11 of rubberized tire fabric is required to be folded around the bead ring with outstanding edges 12 which are built into the carcass of the tire during the assembling process. The edges 12 are not ordinarily left even or matched, a given amount of lap 13 being provided for, to taper off the thickness of the flipper strip.

The machine itself comprises a base 14 and column 15 on which is mounted a bracket 16 carrying the driving motor 17 which actuates a train of gears through a clutch 18 which is controlled by the operator through the bell crank 19, rod 20, and footlever 21. A spring 22 serves to render the lever 21 more sensitive in that it will tend to disengage the clutch immediately pressure on the lever is released. The train of gears mentioned comprises a worm reduction 23, the end of the worm wheel shaft 24 carrying a spur gear 25 for driving rollers to be described later.

The top of the column 15 supports a bracket or backbone 26 in plate form which serves to support all the working parts from the driven side of the clutch on. To maintain an orderly presentation the parts will be taken up in the order in which they apply to the work.

The bead proper passes over a hook guide 27 which is adjustable in and out due to its threaded shank and also in the plane of the backbone by means of a shiftable support 28 to permit adjustment for varying bead ring diameters. The fabric or flipper strip 11 is guided to an adjustable roller 29, which presses it against the underside of the bead, by an adjustable mounted plate 30 having an upstanding fixed flange 31 and a movable flange 32 to care for varying widths of flipper strips. In and out movement of the plate 30 determines the amount of lap 13 in the finished flipper strip.

From the first roller 29 the bead and fabric pass to an adjustable flanged roller 33 which is driven from the spur gear 25 and therefore serves to draw the bead and fabric through the first pair of idler rolls. The roller 33 serves as a forming roll as the fixed flange thereof bends the fabric up along the left side of the bead. A mating flange 34 is provided, threaded on the hub of the roller 33 and pinned thereto by a spring retained plunger 34ª which can be inserted in any one of a plurality of holes in the web of the flange 34 thus determining the spacing of the two flanges. A bevelled roll 35 contacts the right side of the bead to force it against the fixed flange 33 to insure a good bond between the fabric and the bead.

Mounted on a stud 36 is a free roller 37 over which the base of the bead moves. Outside this roller is an adjustable angularly disposed support 38 for the fabric edge resulting from folding the fabric up the left side of the bead. As the bead and fabric approach the support 38 the fabric extends out approximately flat on the right side of the bead. A folder or plow 39 serves to pick up this fabric and lap it over the bead and the other edge of the fabric, at the same time giving some frictional effect between the support 38 and folder 39 on the overlapping fabric edges.

The last and most important operation is performed by a pair of double bevel rolls 40 and 41, the roll 40 within the circumference of the bead being driven by the gear 25 at a peripheral speed greater than that of the rim of the large folding roller 33 to rub the fabric out to the edge to stretch it to the greater circumference required to prevent ruffling. These two rollers also serve to press the entire surface of the fabric to give a uniform bond with the bead.

It is to be noted that the fixed support 38, the two driven rollers 33 and 40, the free roller 37 and the hook guide 29 are all mounted on the backbone and are within the periphery of the bead. Mention of the mountings of the rollers outside the periphery of the bead has been purposely omitted up to this point. A curved arm 42 is pivoted to the backbone at 43 and carries the rollers 35 and 41 as well as the folder 39. Near the free end of the arm a rod 44 is attached which leads to a lever 45 which in the position shown in Figure 2 serves to bring the rollers into contact with the driven rollers 33 and 40. Lifting up on this lever serves to push out the arm 42 carrying the parts mounted thereon clear of the parts within the periphery of the bead to allow removal thereof. The mounting of the roller 35 is not directly on the pivoted arm 42 but on an auxiliary arm 46 which is spring urged inwardly by an adjustable spring mounting 47. The arm 46 is pivoted at the point 43 and will be carried outwardly together with the arm 42.

Guide bars 50 together with an apron 51 are secured to the backbone and so spaced as to insure against accidental engagement between the fabric and bead prior to reaching the roller 27.

The sequence of operations are shown graphically in Figures 4 to 7 wherein the bead is first tacked on its bottom to a gummed fabric, next the fabric is folded up one side the bead and then up the other side and lastly rubbed and stretched to assure a true conical surface of the outstanding edges of the fabric.

I am aware that many changes may be made, and numerous details of construction may be varied through a wide range without departing from the principles of this invention, and I therefore do not purpose limiting the patent granted, otherwise than necessitated by the prior art.

I claim as my invention:

1. The method of forming flipper strips on tire beads comprising tacking the gummed fabric strip to the bottom of the bead, folding one edge of the strip up one side of the bead, folding the free edge of the strip over the other side of the bead to contact the first mentioned edge and rubbing the contacting edges outwardly to stretch them into a smooth cone.

2. In a machine of the class described, means for bringing a bead and a flipper strip into initial contact, means for folding said strip about said bead, and means having a relative rubbing motion for stretching the outstanding edges of said flipper strip to provide a true conical surface suitable for assembly in a tire carcass.

3. In a machine of the class described a plurality of folding and stretching rollers located within the periphery of a bead, a plurality of rollers mating with the first mentioned rollers and located outside the periphery of the bead, and means for simultaneously lifting said second set of rollers away from said bead to allow removal and replacement thereof.

4. In a bead flipping machine a pair of stretching rollers one of which is power driven at a peripheral speed greater than the movement of the work to stretch the outstanding edges of the flipper strip into a smooth frustrum of a cone.

5. In a bead flipping machine guide means adjustable to produce various amounts of lap of the fabric folding means for folding the fabric about the bead and conical stretching rolls for compensating for the greater perimeter of the flipper strip edges as compared to the bead.

6. In a machine of the class described means for folding rubberized fabric about a bead strip and rubbing means causing the free ends of the fabric to stand out as a smooth frustrum of a cone.

7. In a machine of the class described adjustable means for guiding a flipper strip into contact with a bead, means for folding said strip about said bead, and conical rolls for stretching the outstanding edges of said folded strip into a smooth surface.

In testimony whereof I have hereunto subscribed my name.

EDWARD HUTCHENS.